United States Patent
Franklin (10) Patent No.: US 7,006,768 B1
(45) Date of Patent: Feb. 28, 2006

(54) METHOD AND APPARATUS FOR THE ZONAL TRANSMISSION OF DATA USING BUILDING LIGHTING FIXTURES

(76) Inventor: Philip G. Franklin, 530 Avenida Victoria, Apt. E, San Clemente, CA (US) 92672

( * ) Notice: Subject to any disclaimer, the term of this patent is extended or adjusted under 35 U.S.C. 154(b) by 5 days.

(21) Appl. No.: 08/997,570

(22) Filed: Dec. 23, 1997

Related U.S. Application Data (60) Provisional application No. 60/034,176, filed on Jan. 2, 1997.

(51) Int. Cl.
*H04B 10/00* (2006.01)
(52) U.S. Cl. ............ 398/127; 398/115; 398/162; 398/172
(58) Field of Classification Search ............ 359/180, 359/181, 172, 133; 398/115–131, 162, 166, 398/172
See application file for complete search history.

(56) References Cited

U.S. PATENT DOCUMENTS

| | | | | |
|---|---|---|---|---|
| 4,856,090 A | * | 8/1989 | Kitani et al. ............ | 455/607 |
| 5,193,201 A | * | 3/1993 | Tymes ............ | 395/800 |
| 5,321,542 A | * | 6/1994 | Freitas et al. ............ | 359/113 |
| 5,424,859 A | * | 6/1995 | Uehara et al. ............ | 359/152 |
| 5,635,915 A | * | 6/1997 | Gray ............ | 235/383 |
| 5,719,567 A | * | 2/1998 | Norris ............ | 340/953 |
| 5,838,116 A | * | 11/1998 | Katyl et al. ............ | 315/307 |
| 5,903,373 A | * | 5/1999 | Welch et al. ............ | 359/152 |
| 6,198,230 B1 | | 3/2001 | Leeb et al. | |
| 6,400,482 B1 | | 6/2002 | Lupton et al. | |
| 6,426,599 B1 | | 7/2002 | Leeb | |
| 6,504,633 B1 | | 1/2003 | Hovorka et al. | |
| 6,794,831 B1 | | 9/2004 | Leeb et al. | |

* cited by examiner

*Primary Examiner*—Agustin Bello
(74) *Attorney, Agent, or Firm*—William G. Lane (57) ABSTRACT

This invention relates to the zonal transmission of data by the modulation of the light output of arc lamps or discharge lamps; including the visible or invisible light output of fluorescent lamps, mercury vapor lamps, high or low-pressure sodium lamps, metal-halide based lamps, or other arc or discharge lamps. The method results in an easily installed, easily maintained, and economical to purchase, optical-wave communications system which exploits the existing infrastructure of a building or facility to facilitate the transmission of data in individual zones; thereby facilitating the transmission of wide-area as well as zonal-specific data to compatible receivers, and further facilitating the determination of location of remote devices or users, and the delivery or exchange of information or data, utilizing limited range transmission techniques.

23 Claims, 6 Drawing Sheets

FIG. 6

METHOD AND APPARATUS FOR THE ZONAL TRANSMISSION OF DATA USING BUILDING LIGHTING FIXTURES

CROSS-REFERENCES TO RELATED APPLICATIONS

This is one patent application anticipated when Provisional Patent Application Ser. No. 60/034,176 was filed the 2nd of Jan. 1997. Additionally, this application is also related to patent application Ser. No. 08/673,380 filed the 24 Jun. 1996, in that the devices in said application are operable and were envisioned to be used with the devices in this application.

BACKGROUND

1. Field of Invention

This invention relates to the transmission of data by the modulation of the light output of fluorescent and other arc lamps; including the visible or invisible light output of fluorescent lamps, neon lamps, mercury vapor lamps, high or low-pressure sodium lamps, or other high-intensity discharge lamps, or any metal-halide based lamps.

2. Description of Prior Art

Several methods for the transmission and reception of data messages exists. Many of these have application to offices, factories, and to buildings or complexes of buildings in general. For example, low-powered radio transmission can be used to transmit and receive data messages within a building, or the optical and infrared spectrum can be used for the transceiving of data.

However, the use of radio frequencies requires licensing and coordination for their use. Given the overcrowded radio spectrum in some areas, said licensing may be nearly impossible. In addition, while radio facilitates the transmission of data, in general that data transmission is limited in bandwidth and therefore limited in the speed of transmission. Additionally, radio energy is hard to confine, and there it is not practical to limit data transmission to the confines of any one building or office within a building or office.

In contrast, infrared transmission of data has the benefit of no licensing requirement, higher available bandwidth, and ease of confinement. However, as infrared energy is not transparent to walls or other structures, the cost of installation of an independent building-wide infrared-based transmission system is extreme. That is, each office and hallway within a building must be equipped with one or more infrared transmitters in order to provide coverage to the entire building. Each infrared transmitter will require lines for it's operating power and a data line for the data that is to be transmitted, thus requiring a supporting infrastructure that is both extensive and expensive.

In addition to wireless optical transmission as examined above, several examples exist of using modulated light in conjunction with optical fibers for the transmission of data, but these do not lend themselves to application to devices that are portable or mobile within buildings or offices.

OBJECTS AND ADVANTAGES

Accordingly, several objects and advantages of the present invention are:

(a) The ability to utilize an existing infrastructure for the transmission of data messages.

(b) To facilitate the ability to track and locate a user or device within a facility, with greater accuracy and lower cost compared to existing technologies.

(c) To facilitate a rapidly and easily installed wireless transmission system, not requiring licensing.

(d) The reduction of radio frequency congestion by reducing or eliminating In-House radio transmissions.

(e) The reduction of radio frequency congestion by reducing or eliminating public carrier system paging, messaging, or control channel radio transmissions.

(f) To facilitate the command, control, and operation, of radio units in areas of high radio density, by utilizing optical means, thus resulting in greater efficiency and less interference and interruption.

(g) To facilitate delivery of messaging and paging services by optical means, whilst an otherwise radio device is transmitting or receiving radio traffic.

(h) To facilitate additional radio frequency re-use in a coordinated and controlled radio system.

(i) To facilitate the transceiving of user status information, messaging traffic, and other data, on a radio device that otherwise does not support such services.

(j) To facilitate greater top-security and privacy communications, through the utilization of the optical means as a physically more-limited distribution channel, for the delivery of changing encryption keys and other security data and signaling, in various secure communications schemes.

(k) To facilitate a more transparent operation of PBX systems and equipment.

(l) To facilitate the operation of Public Address and audible paging systems that minimize disturbance to others.

(m) To facilitate the operation of message paging and personnel/equipment locating systems on military vessels so as to not be detectable by enemy electronic surveillance measures.

(n) To facilitate the operation of message paging and personnel/equipment locating systems on metal-constructed vessels, without the interference, reflections, cancellations, echoes, or lapse in coverage, that a radio-based system would otherwise suffer from.

Further objects and advantages of my invention will become apparent from a consideration of the drawings and ensuing description.

LIST OF REFERENCED NUMERALS

4 Fluorescent Lamp
102 Rectifier, Filter, and Dual-Voltage Power Supply
104 Switching Circuit
106 Microprocessor Control Circuit
108 Transformer
110 Heater Winding 'A'
112 Heater Winding 'B'
114 Arc Winding
150 Lamp and Switching Assembly
202 Graph Line
252 Raw Binary Data
254 Binary Voltage Level
256 Lamp Output
258 Frequency Series
302 Power Line Carrier Transceiver
306 Radio Transceiver
402 Fluorescent Ballast Assembly 11
404 Fluorescent Ballast Assembly 12
502 Ceiling
504 Lamp Assembly 1
506 Lamp Assembly 2
508 Pager 'A'
510 Pager 'B'
512 Pager 'C'
602 Lamp and Switching Assembly 1
602 Lamp and Switching Assembly 2

SUMMARY OF INVENTION

This invention proposes to modulate the light generated by gas-discharge lamps, such as fluorescent lamps, mercury vapor lamps, and sodium vapor lamps, commonly found in and around offices and buildings, with control, location, and other data messages. The modulated light is then received by various types and configurations of devices, and used for the determination of their location, to control their operational parameters, or to simply receive data messages.

The use of fluorescent lamps and lighting has been widespread in the consumer and industrial market for many years. The vast majority of office buildings and high rises make use of florescent lighting by installing fluorescent fixtures in a grid-like fashion throughout lobby areas, private office space, open planning areas, conference rooms, and hallways. Thus, many buildings have a quasi-zonal light transmitting X-Y grid system that if properly utilized represents an important infrastructural system already in place. I propose to utilize that existing Cartesian infrastructure for the creation of a zone-based data transmission system for use within an office or building.

In addition, I propose to utilize that existing infrastructure for the determination of the location of users location within an office or building through the automatic and transparent radio or optical reporting of which fluorescent fixture is closest to a person or other target that is being sought. In this way, the position of a user or target can be determined with greater accuracy than that afforded by indoor radio triangulation or even GPS means (if indoor GPS were practical).

In addition to data transmission and determination of location, some, but not all, of the anticipated applications of the method of zonal data transmission by ballast and fluorescent or arc lamps include their use in:

Private in-house cellular systems; and
Private in-house PCS systems; and
Private in-house paging systems; and
Office or building-wide wireless data transmission systems; and
PBX systems with automatic and transparent "follow-me" functions for forwarding phone calls and faxes; and
Zonal PBX or other Public Address or paging systems; and
Security and access level badge systems; and
On-board commercial and military vessels for use in a safe-and-secure (non-radiating) paging and locating system.

DESCRIPTION OF INVENTION

Main Embodiments

Note that part names as used herein are descriptive only, and should not be taken as limiting their function or purpose. It is important to note that functional blocks in the figures are shown for purposes of discussion only, and nothing therein should be construed to imply their necessary configuration or even presence for my invention to work. In addition, similar embodiments based on infrared, visible, or ultra-violet optical communications, or a combination thereof, or a mix of one spectrum for transmission and a different spectrum for reception, are anticipated by this invention.

The main embodiment of the invention describes an fluorescent lamp lighting ballast that uses the output of the lamp or lamps under it's control to transmit data to one or more receivers. The configuration allows for the transmission of fixed data messages, such as a serial number, while allowing for the transmission of data messages that can be modified in the field. This embodiment, while not the most basic embodiment of my invention, is never-the-less one of the more useful and lesser expensive embodiments.

It is important to note that several wireline or wireless data exchange techniques exist and can be used with the invention. The data transfer techniques discussed and illustrated herein are for purposes of discussion only, and should not be construed to limit the scope of the invention.

Figure 1:
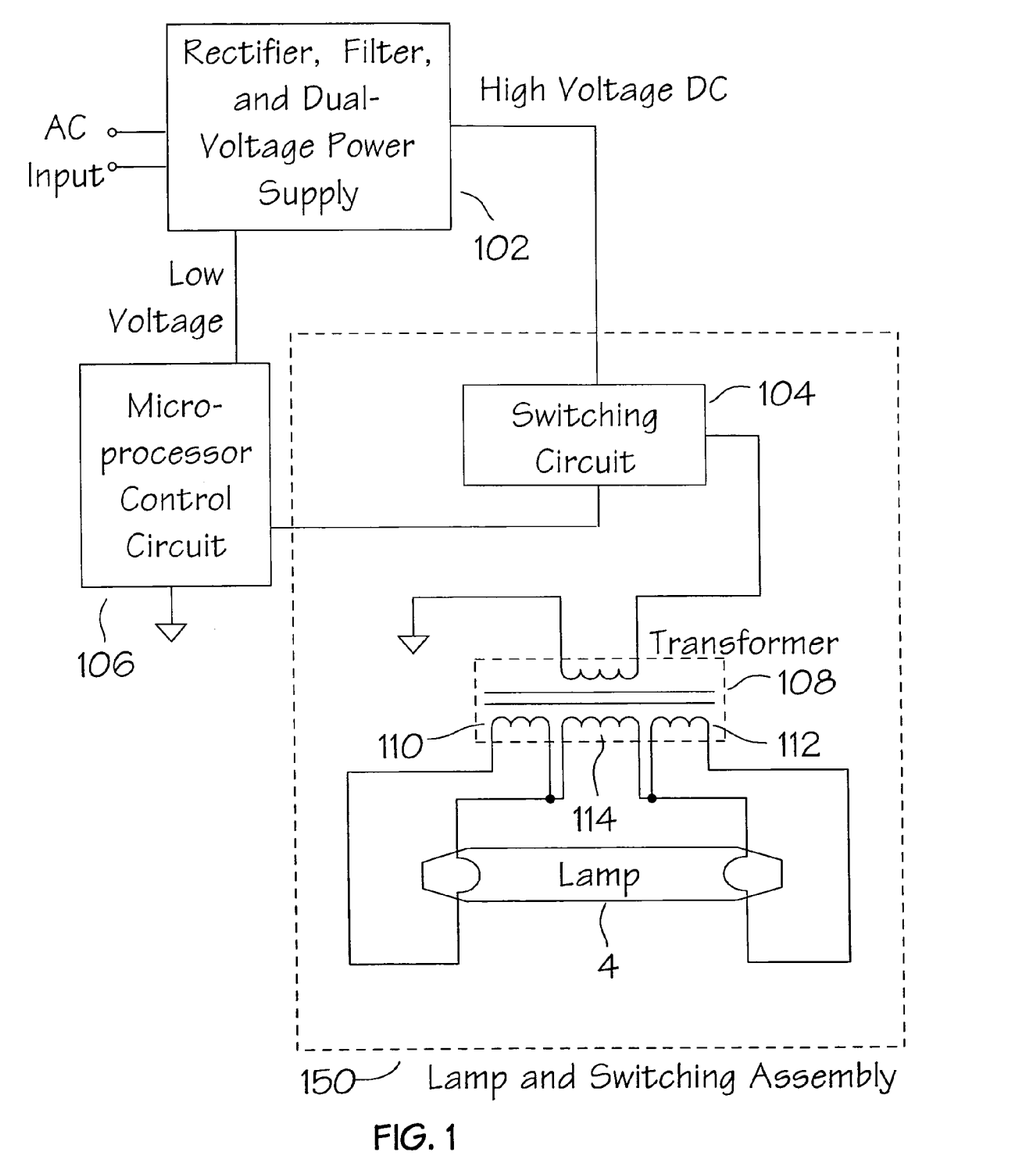
FIG. 1 is a block diagram of some possible circuitry for implementation of my invention.

FIG. 1 is a diagram showing the basic circuitry necessary to implement a basic embodiment of the invention. Rectifier, Filter, and Dual-Voltage Power Supply (102) typically contains a full-wave diode rectifier and filter that converts the incoming AC mains power from AC to DC power. The rectified and filtered voltage is passed out of the Rectifier, Filter, and Dual-Voltage Power Supply (102) as the high-voltage (150–350 Volt) supply. Also within Rectifier, Filter, and Dual-Voltage Power Supply (102) is a low-voltage circuit that taps some of the high-voltage, regulates it, and then passes it out as a low-voltage (typically around 5 volts DC) supply.

The high-voltage supply is passed to Switching Circuit (104). Switching Circuit (104) is under control of the Microprocessor Control Circuit (106). When Microprocessor Control Circuit (106) enables Switching Circuit (104), the high-voltage output from Rectifier, Filter, and Dual-Voltage Power Supply (102) is passed on to the primary windings of Transformer (108).

Switching Circuit (104) facilitates Microprocessor Control Circuit (106) controlling the switching rate and waveform of the voltage supplied to Transformer (108), and hence determines the output voltage and waveform from the secondary windings of Transformer (108); namely, Heater Winding 'A' (110), Heater Winding 'B' (112), and Arc Winding (114).

Heater Winding 'A' (110), and Heater Winding 'B' (112), are lower voltage windings used to supply the voltages necessary for the operation of filament heaters (cathodes) of Fluorescent Tube (4). The higher-voltage output of Arc Winding (114) is coupled to each of the filament windings so as to place a high-voltage potential between the cathodes of Fluorescent Tube (4).

Fluorescent Tube (4) is any fluorescent lamp tube or type, including straight or curved heated cathode fluorescent bulbs, compact fluorescent bulbs (CFL), or cold cathode fluorescent bulbs (CCFL). In the actual laboratory demonstration circuits, the Fluorescent Tube (4) first used was a F4T5, and later the circuitry was modified to accommodate two Philips brand F8T5/CW lamps.

Microprocessor Control Circuit (106) consists of a core microprocessor circuit, memory circuitry, timing or frequency source and circuitry, and other auxiliary circuitry. The timing source and circuitry is used to clock the microprocessor, and potentially through other circuits, provide the frequencies that will be used for toggle rates of Switching Circuit (104), and therefore the toggle rates of the lamp and associated light output.

Microprocessor Control Circuit (106) is powered by the low-voltage output of Rectifier, Filter, and Dual-Voltage Power Supply (102), and also holds the data to be transmitted within the memory circuitry. The memory circuitry can consist of Random Access Memory (RAM) and/or Read-Only Memory (ROM). Both the RAM and ROM can be of any configuration and of any type. The memory is programmed at the factory and/or from one or more sources in the field.

Lamp and Switching Assembly (150) represents the switching, transformer, and lamp function blocks as defined herein. That is, Switching Circuit (104), Transformer (108), and Fluorescent Tube (4), are within Lamp and Switching Assembly (150). The Lamp and Switching Assembly (150) function block serves to simplify some of the remaining discussion by not having to repeat the descriptions of repeating common function blocks.

Figure 2A:
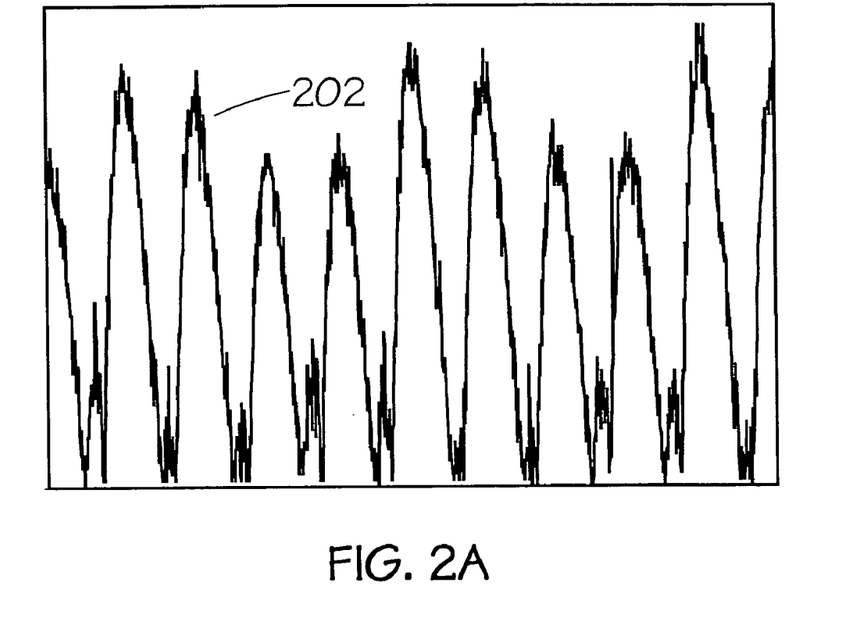
FIG. 2A is a graphic representation of the output from a typical fluorescent tube operated by a circuit similar to that represented in FIG. 1.

FIG. 2A is a graph of the output from a typical fluorescent tube operated on a circuit similar to that diagrammed in FIG. 1. The diagram shows the output from a Philips F8T5/CW fluorescent tube, operated at a 40 kHz flash rate. Graph Line (202) shows that while some noise and harmonic frequencies are present, the basic flash-rate signal is never-the-less evident, and easily recoverable by filtering and limiting.

Figure 2B:
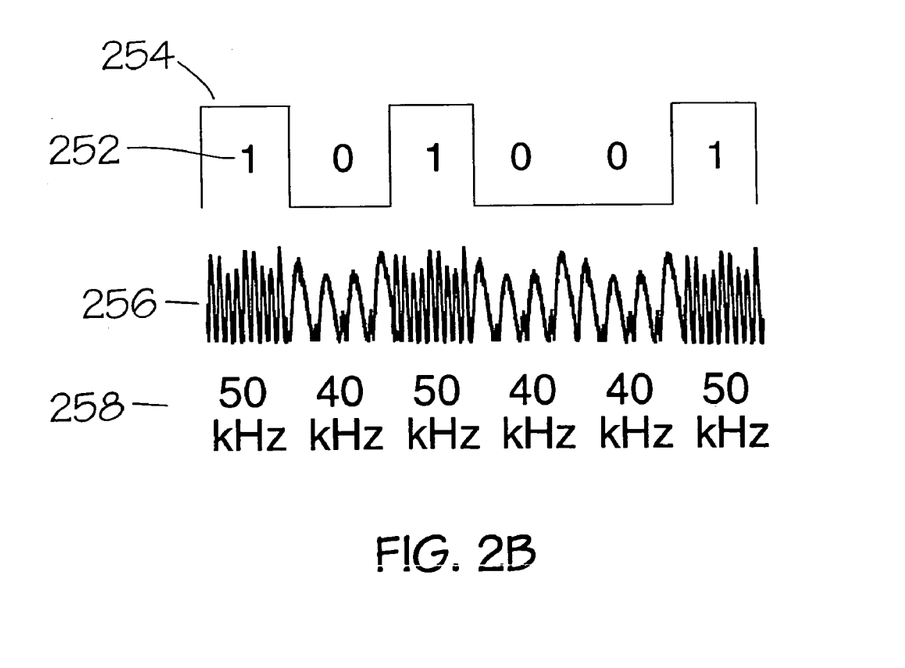
FIG. 2B illustrates one method of data encoding anticipated by my invention: Frequency Shift Keying (FSK).

FIG. 2B illustrates one method of data encoding: Frequency Shift Keying (FSK). FSK is chosen here for ease of application and data recovery, but any modulation method is applicable. The use of FSK herein should not be taken as to in any way limit the modulation method anticipated by the invention.

For the purposes of this discussion, we will presume that the microprocessor controls an external timing or frequency circuit [outside of the microprocessor, but within the Microprocessor Control Circuit (106) of FIG. 1], that in-turn generates the toggle frequencies for application to Switching Circuit (104) of FIG. 1. However, it should also be noted that the invention also anticipates the microprocessor directly generating the toggle frequencies without the need for an external timing or frequency circuit.

The Raw Binary Data (252) to be transmitted is shown to be "101001". This binary data is typically translated to a logic-level voltage shown therein as Binary Voltage Level (254) generated by the microprocessor. The Binary Voltage Level (254) is then applied to an timing circuit whereby one of two toggle frequencies are generated. The two frequencies are arbitrarily chosen to represent binary 1's and 0's. For our discussion, we will use a toggle frequency of 50 kHz to represent a binary data "1", and a 40 kHz frequency to represent a binary data "0".

The output of the timing circuit, whether 40 kHz or 50 kHz is applied to Switching Circuit (104) of FIG. 1. The required Frequency Series (258) for the representation of binary data "101001" is shown. These series of frequencies are applied to Switching Circuit (104) of FIG. 1, which in-turn controls the output of the fluorescent lamp. The output of the fluorescent lamp is represented as Lamp Output (256).

Figure 3:
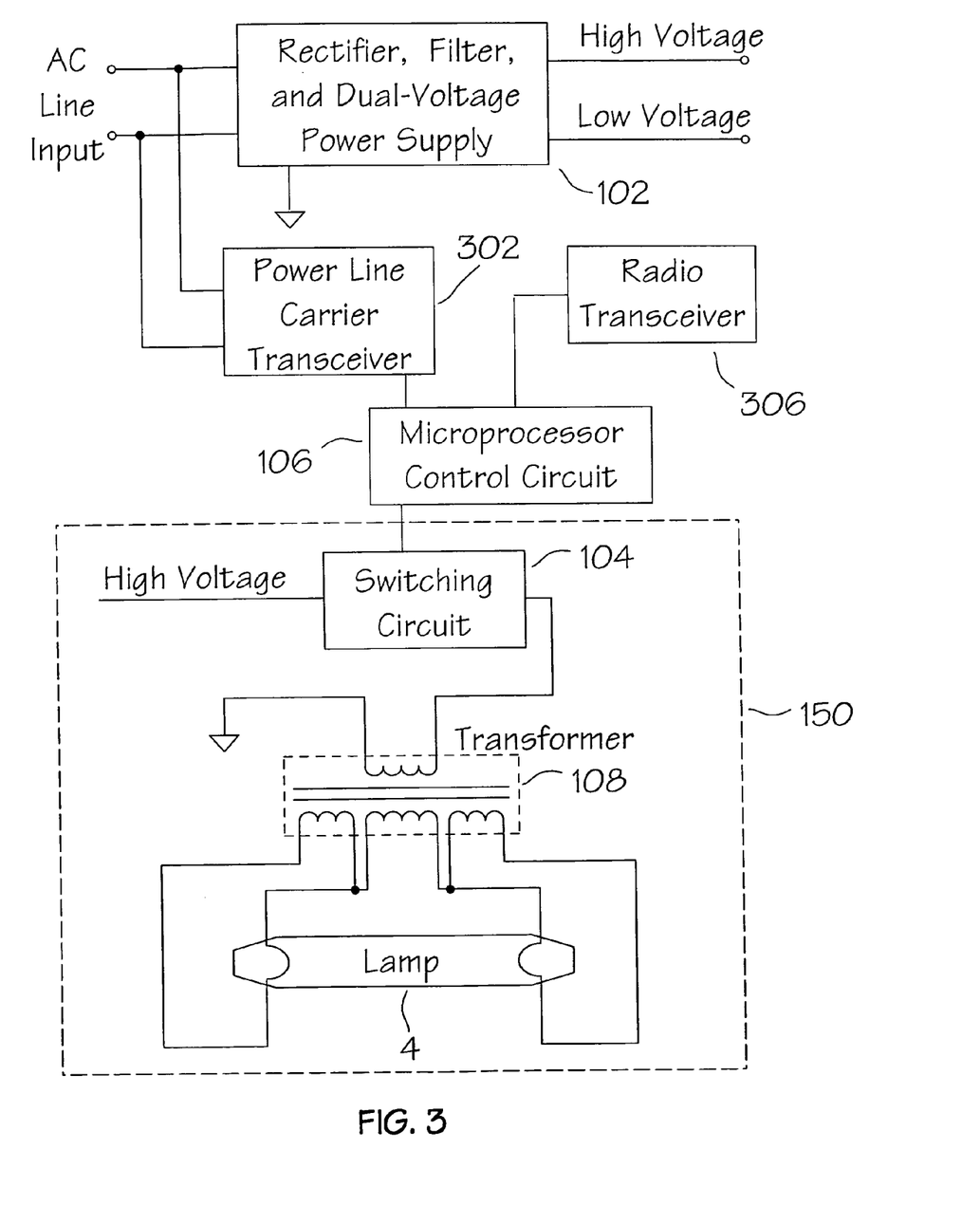
FIG. 3 is a block diagram of the main embodiment of my invention.

FIG. 3 is a block diagram of the main embodiment of my invention. Rectifier, Filter, and Dual-Voltage Power Supply (102) performs the same power supply functions as before. Although not shown, the low voltage output of the Rectifier, Filter, and Dual-Voltage Power Supply (102) is distributed to the Power Line Carrier Transceiver (302) circuitry, the Microprocessor Control Circuit (106) circuitry, and the Radio Transceiver (306) circuitry.

Power Line Carrier Transceiver (302) is circuitry that receives and transmits either data or audio (or both data and audio) signals by way of a modulated carrier wave superimposed on the power line connections. The use of any carrier frequency with any modulation scheme in the invention is possible, although certain combinations may have limitations that are not acceptable.

As a non-limiting example, an Echelon® PLT-10A Power Line Transceiver (manufacturer's model number 50080-02) is a possible choice for use in the Power Line Carrier Transceiver (302) circuitry, and is compatible with a standard that exists in the marketplace. The PLT-10A facilitates a 10 kilobits per second network rate using direct sequence spread-spectrum in the 100 kHz to 450 kHz spectrum. For the purposes of this discussion, the use of an Echelon® PLT-10A Power Line Transceiver would also facilitate operation of the ballast unit on a LonWorks® compatible network which is also a present standard in the marketplace. [Echelon® and LonWorks® are Registered Trademarks of the Echelon Corporation.]

Other circuits and variations are possible, including employing discrete parts to produce FM, PCM, or AM modulation of a carrier. The bottom-line significance of the Power Line Carrier Transceiver (302) is that it is a circuit that facilitates communication via the power line wiring, thus allowing communications to and from the ballast invention, without requiring separate communications wiring to be installed to each ballast.

As before, Microprocessor Control Circuit (106) is powered by the low-voltage output of Rectifier, Filter, and Dual-Voltage Power Supply (102), and also holds the data to be transmitted within the memory circuitry. The memory circuitry can consist of Random Access Memory (RAM) and/or Read-Only Memory (ROM). Both the RAM and ROM can be of any configuration and of any type. Microprocessor Control Circuit (106) now also receives and transmits data via Power Line Carrier Transceiver (302).

Radio Transceiver (306) can receive data or signals from any radio source, and said data or signals are then sent to Microprocessor Control Circuit (106). The data can be used to either program the operation or function of Microprocessor Control Circuit (106), or enter data that is to be stored and later transmitted by Microprocessor Control Circuit (106) via the lighting circuitry, or be transmitted via Power Line Carrier Transceiver (302), or any other use of the data can be made of by Microprocessor Control Circuit (106).

Radio Transceiver (306) can also transmit data or signals to any radio receiver that is in range. The transmission of said radio transmitted data or signals is under the control of Microprocessor Control Circuit (106). The radio transmitted data can be used to control or send data to remote devices that may or may not have compatible optical receivers.

That is, taken together, FIG. 3 defines a ballast assembly that can transmit and/or receive zonal data by radio means, and not necessarily rely on optical transmission means or pathways.

Lamp and Switching Assembly (150) again represents the switching, transformer, and lamp function blocks as defined before in FIG. 1. That is, Switching Circuit (104), Transformer (108), and Fluorescent Tube (4), all of FIG. 1, are within Lamp and Switching Assembly (150).

Thus FIG. 3 diagrams a ballast assembly that contains microprocessor and memory circuitry, that can receive data either by radio or power line carrier, and can transmit data either by power line carrier, radio carrier, or by arc lamp output.

Note that while the primary spectrum anticipated for application under this invention is optical (visible, infrared, and ultraviolet); the use of the radio and/or electromagnetic spectrum emissions of fluorescent and other arc lamps is also anticipated as a possible carrier of data for use in the invention. That is, the emissions in the radio spectrum often classified as noise or Radio Frequency Interference (RFI), and the radiation of other electro-magnetic spectrum signals often classified as noise or Electro-Magnetic Interference (EFI); are in fact in this invention anticipated as being useful for some applications, and therefore are not necessarily considered to be noise.

Figure 4:
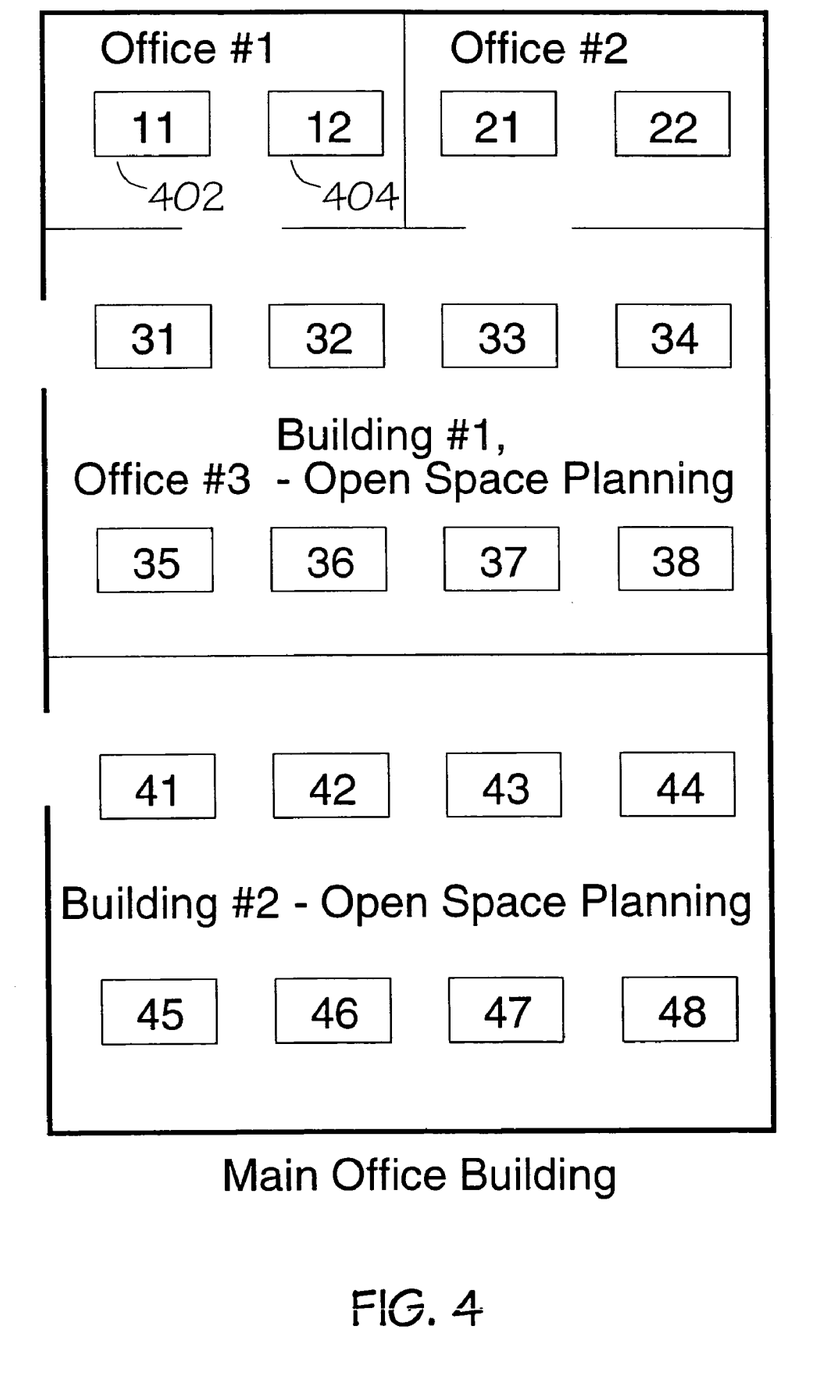
FIG. 4 diagrams a building floor plan showing a possible arrangement of lighting luminaries incorporating the invention.

FIG. 4 diagrams a building floor plan showing a possible arrangement of lighting ballasts incorporating the invention. Fluorescent Ballast Assembly 11 (402) and Fluorescent Ballast Assembly 12 (404) each represents one of the ballast assemblies of the invention. Among the data messages being transmitted by light are their serial numbers as "11" for Fluorescent Ballast Assembly 11 (402), and "12" for Fluorescent Ballast Assembly 12 (404).

Figure 5:
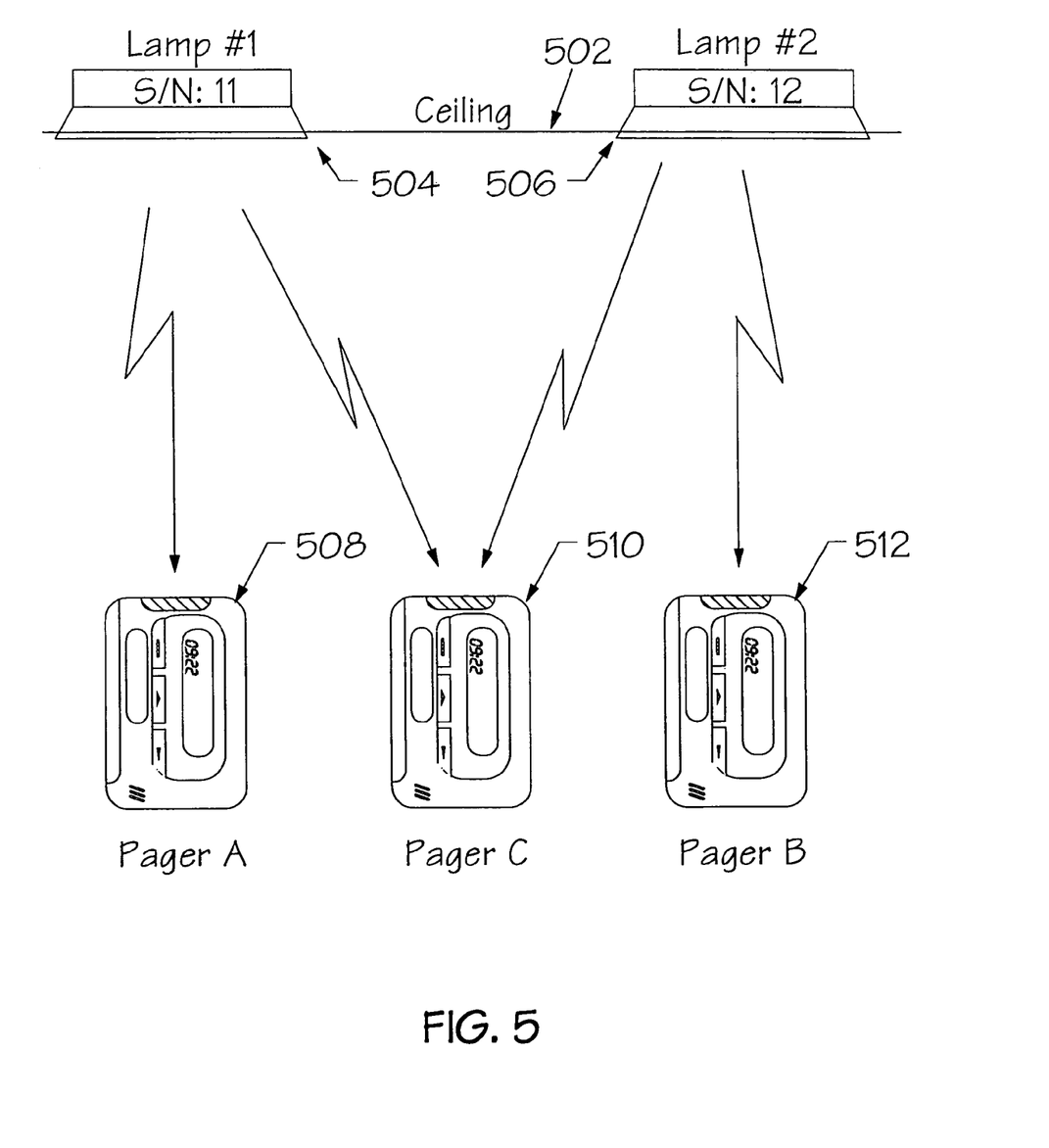
FIG. 5 illustrates one of many applications of the invention: application to pagers.

FIG. 5 illustrates one of many applications of the invention. Ceiling (502) represents the ceiling of a typical office. Lamp Assembly 1 (504) corresponds to Fluorescent Ballast Assembly 11 (402) of FIG. 4, and Lamp Assembly 2 (506) corresponds to Fluorescent Ballast Assembly 12 (404) of FIG. 4.

Each of Lamp Assembly 1 (504) and Lamp Assembly 2 (506) are assemblies which house the ballasts and fluorescent lamps as described herein. The ballast of Lamp Assembly 1 (504) is modulating it's fluorescent lamps to output a serial number of "11". The ballast of Lamp Assembly 2 (506) is modulating it's fluorescent lamps to output a serial number of "12".

Pager A (508), Pager B (510), and Pager C (512), are pagers that are capable of receiving and decoding the optical output of a ballast of the invention.

OPERATION OF INVENTION

Main Embodiments

Refer to FIG. 1. The power from the AC mains of the building enters into the ballast assembly and is applied to Rectifier, Filter, and Dual-Voltage Power Supply (102) wherein it is rectified and filtered and outputted as two voltages: Low Voltage and High Voltage. The High Voltage is primarily used by the fluorescent lamp operating power supply circuitry to operate Fluorescent Tube (4).

Specifically, the High Voltage is switched by Switching Circuit (104) and applied to Transformer (108) where it is boosted and applied to the cathodes of Fluorescent Tube (4). The filaments of Fluorescent Tube (4) also derive their operating voltage from Transformer (108).

Specifically, the switched high voltage supply from Switching Circuit (104) is applied to the primary winding of Transformer (108). The higher voltage secondary winding Arc Winding (114), supplies the voltages necessary to form and maintain the arc through Fluorescent Tube (4). The output of Arc Winding (114) are coupled one each to the lower voltage secondary filament windings Heater Winding 'A' (110), and Heater Winding 'B' (112). Each of Heater Winding 'A' (110), and Heater Winding 'B' (112) generate the voltages necessary to cause the heater/filaments of Fluorescent Tube (4) to operate.

Note that the actual circuitry that is used to operate Fluorescent Tube (4) is not important to this invention in as much as any high voltage fluorescent tube circuitry can be used, so long as the switching rate can be modified under control of the controller or microprocessor circuit. Further note that the actual type of fluorescent or arc lamp that is used as Fluorescent Tube (4) is not important to this invention in as much as any arc lamp bulb will function in the invention, so long as the circuitry and specifications of the voltages and waveforms are so adjusted.

The Low Voltage is distributed to Microprocessor Control Circuit (106) and to other circuits and assemblies that are auxiliary to Microprocessor Control Circuit (106). Note that in FIG. 1 that while their are no auxiliary and/or support circuits shown, many are possible, and indeed some are discussed herein.

Microprocessor Control Circuit (106) consists of a microprocessor, clock, and other support circuitry, and also includes both operating program memory, and memory used to store data messages that are to be transmitted. The microprocessor in Microprocessor Control Circuit (106) generates signals that are used to control the switching rate of Switching Circuit (104) and thus cause the output of Switching Circuit (104) to frequency shift from one frequency to another. Therefore, the light output of Fluorescent Tube (4) frequency shifts from one frequency to another under the direct control of Microprocessor Control Circuit (106).

Note that it is not of importance to the claims of this invention as to how many optical flash rates or frequencies are generated or used, nor as to how those optical flash rates or frequencies are generated. Generation of the optical flash rates or frequencies used herein can be directly as an output of the microprocessor, or by a separate generation circuit under control of the microprocessor. The use of more than two optical flash rates or frequencies to represent more than two data symbols is anticipated by the invention.

FIG. 3 represents the main embodiment of the invention, and is an expansion of circuitry as compared to FIG. 1. In FIG. 3: Rectifier, Filter, and Dual-Voltage Power Supply (102); Switching Circuit (104); Microprocessor Control Circuit (106); Transformer (108); and Lamp and Switching Assembly (150); are as described above in the discussion of FIG. 1. Although not shown, the Rectifier, Filter, and Dual-Voltage Power Supply (102) outputs (High and Low Voltages) are distributed as appropriate and as needed to power the circuitry represented in this diagram.

As before, the actual circuitry and fluorescent or arc lamp type used within Lamp and Switching Assembly (150) is not of major significance to the invention, and many variations of such circuitry is anticipated.

Added here in FIG. 3 is Power Line Carrier Transceiver (302). Power Line Carrier Transceiver (302) is used both to receive data transmitted by a message generating device or controller that is sending message or controlling data over a carrier frequency superimposed on the AC mains, and to transmit back to said message generating device or controller data generated by Microprocessor Control Circuit (106) or data received by other means.

Also added here in FIG. 3 is Radio Transceiver (306). Radio Transceiver (306) is a radio transceiver used to monitor and receive radio signals from devices that are compatible with the invention. If so desired and configured, Radio Transceiver (306) can also transmit data or signals to any radio receiver that is in range.

The transmission of said radio transmitted data or signals is under the control of Microprocessor Control Circuit (106). The radio transmitted data can be used to control or send data to remote devices that may or may not have compatible optical receivers. Alternatively, Radio Transceiver (306) can be used to transceive zonal data to compatible devices that are within radio range, but not line-of-sight optical range. For example, a remote device that is within a brief case or purse.

FIG. 3 then, is a ballast assembly which in part generates microprocessor controlled FSK signals that are effectively amplified and applied to a fluorescent lamp, which in turn generates an optical output that contains at minimum a signature of the originating switching frequency that can be read by remote devices compatible with the invention (reference Graph Line (202) in FIG. 2A). Furthermore, the ballast assembly of FIG. 3 contains a power line carrier transceiver for sending and receiving data via the power line wiring of a building, and a radio transceiver that is capable of transceiving radio signals with remote devices.

In application, Microprocessor Control Circuit (106) contains in memory stored data which is to be routinely transmitted. As an example, and without limitation, such data may consist of a lamp assembly serial number, an alphanumeric string describing the location of the lamp assembly and therefore the location of the device receiving the lamp output, the closest telephone extension to that location, and which audible public address paging zone the user is presently in.

Data as described above is routinely transmitted under control of Microprocessor Control Circuit (106), and these data messages are repeated as often as practical. Besides the routine data messages described above, the main embodiment is also capable of receiving other message strings ("Variable Messages") or command strings by either the receiver in Power Line Carrier Transceiver (302) or Radio Transceiver (306).

For example, it is anticipated that a remotely located controlling device ("Base Station") will generate a Variable Message that is to be broadcasted by one or more ballast assemblies. The Base Station will first format said message string, add the necessary addressing information, and then transmit said string via a power line carrier transmitter to one or more ballasts or power line fed devices that are embodiments of the invention. The addressing information contained in the formatted string is any data header or data type that facilitates the identification of which device or devices compatible with the invention are to transmit the string, how often said string is to be transmitted, which remote devices are to receive the data, as well as other control and/or formatting data that are necessary for operation of the system. Control messages are similarly formatted and processed.

In this case, if the embodiment is that of the main embodiment of FIG. 3, the formatted Variable Message is received by the receiver portion of Power Line Carrier Transceiver (302), and then passed to Microprocessor Control Circuit (106) for decoding, storing, and processing. Microprocessor Control Circuit (106) then controls Switching Circuit (104) whereby the voltages (waveforms) applied to Fluorescent Tube (4) cause it (or them, as Fluorescent Tube (4) can represent more than one fluorescent lamp tube) to discharge an optical signal that is frequency shifted (or otherwise modulated) to encode the desired message.

Once a remote device ("Target") receives the optical signal, and successfully decodes the message string, if so designed and commanded the Target will employ a low-power radio transmitter compatible with Radio Transceiver (306) of FIG. 3 to acknowledge the reception of the message, or transmit other data that is requested (such as what is the serial number of the lamp assembly it is presently near).

The transmitted radio signal from the Target is received by Radio Transceiver (306), and is decoded and passed to Microprocessor Control Circuit (106). If so designated, Microprocessor Control Circuit (106) causes the transmitter in Power Line Carrier Transceiver (302) to transmit to the appropriate Base Station.

In an all radio-wave alternative application, the formatted Variable Message generated by the Base Station is received by the receiver portion of Power Line Carrier Transceiver (302), and then passed to Microprocessor Control Circuit (106) for decoding, storing, and processing. Microprocessor Control Circuit (106) then controls Radio Transceiver (306) and transmits the appropriately formatted radio message.

Once a remote device ("Target") receives the radio signal, and successfully decodes the message string, if so designed and commanded the Target will employ a low-power radio transmitter compatible with Radio Transceiver (306) of FIG. 3 to acknowledge the reception of the message, or transmit other data that is requested (such as what is the serial number of the lamp assembly it is presently near).

The transmitted radio signal from the Target is received by Radio Transceiver (306), and is decoded and passed to Microprocessor Control Circuit (106). If so designated, Microprocessor Control Circuit (106) causes the transmitter in Power Line Carrier Transceiver (302) to transmit to the appropriate Base Station.

Therefore, in the overall view, the diagram of the main embodiment of FIG. 3 represents circuitry that can handshake and communicate with both Target devices and Base Station devices.

FIG. 4 shows a typical office floor plan where in fluorescent lamp assemblies form a quasi X-Y coordinate system. That is, while not precisely symmetrical, fluorescent lamp assemblies in offices and other facilities tend to be well distributed, so that if it is known to which assembly a person or Target is nearest, the location of said Target or person will be determined with reasonable accuracy for most applications.

In FIG. 4, Fluorescent Ballast Assembly 11 (402) and Fluorescent Ballast Assembly 12 (404) are both located in Office #1 of Building #1; while the other fluorescent ballast assemblies are not. Therefore, if Fluorescent Ballast Assembly 11 (402) is transmitting it's serial number as "11", and if a suitably designed Target device is decoding the serial number "11", then the Target device is next to or very near Fluorescent Ballast Assembly 11 (402), and most probably is within Office #1 of Building #1. Furthermore, the Target device is most probably located in the left or center of said office as viewed in the floor plan of FIG. 4.

That is, Fluorescent Ballast Assembly 11 (402) is optically transmitting that it's serial number is "11", while Fluorescent Ballast Assembly 12 (404) is optically transmitting that it's serial number is "12". Therefore, any device nearest Fluorescent Ballast Assembly 11 (402) is most probably receiving it's light signal at a higher amplitude than the output of any other lamp assembly, and therefore is decoding the serial number "11".

Note that both Fluorescent Ballast Assembly 11 (402) and Fluorescent Ballast Assembly 12 (404) in this discussion are most probably (but not necessarily) using a modulation method that facilitates a capture effect. That is, whichever light signal is received at the highest amplitude, will supply the optical data that is eventually decoded. Note however, that using timed transmissions with non-capture effect modulation is another method that would also be suitable for application to the invention, and in conjunction with received signal strength measurements could be used to further improve the accuracy of determination of location.

FIG. 5 is illustrative of one of the applications of the invention. Pager A (508) is closest to Lamp Assembly 1 (504) and therefore will decode a lamp assembly serial number of "11". If Pager A (508) is paged, it responds by transmitting an acknowledgment of the page which incorporates the decoded serial number. The transmitted acknowledgment is via an incorporated radio transmitter compatible with the Radio Transceiver (306) of FIG. 3. The ballast assembly then transmits the received pager acknowledgment to the appropriate base or controller station by way of the Power Line Carrier Transceiver (302), also of FIG. 3.

In this fashion, the appropriate base or controller station is made aware that Pager A (508), is near Lamp Assembly 1 (504), and therefore the in-building location of Pager A (508) is now known.

In similar fashion, Pager C (512) is closest to Lamp Assembly 2 (506). If Pager C (512) is paged, it responds by transmitting an acknowledgment of the page which incorporates the decoded serial number. The transmitted acknowledgment is by an incorporated radio transmitter compatible with the Radio Transceiver (306) of FIG. 3. The ballast assembly then transmits the received pager acknowledgment to the appropriate base or controller station by way of the Power Line Carrier Transceiver (302), also of FIG. 3.

In the case of Pager C (510) however, Pager C (510) may be decoding either the serial number of Lamp Assembly 1 (504) or Lamp Assembly 2 (506). Pager C (510) will decode the serial number of whichever lamp assembly the optical detector of Pager C (510) is receiving the strongest.

Alternatively, if Lamp Assembly 1 (504) and Lamp Assembly 2 (506) use an amplitude modulation scheme (or other appropriate modulation method), and their transmissions are appropriately staggered in timing windows, both of their serial numbers could be decoded and reported to the appropriate base or control station, along with received signal strengths if the pager is so equipped.

OPERATION OF INVENTION

Alternative Embodiment—Multiplexed Operation

Figure 6:
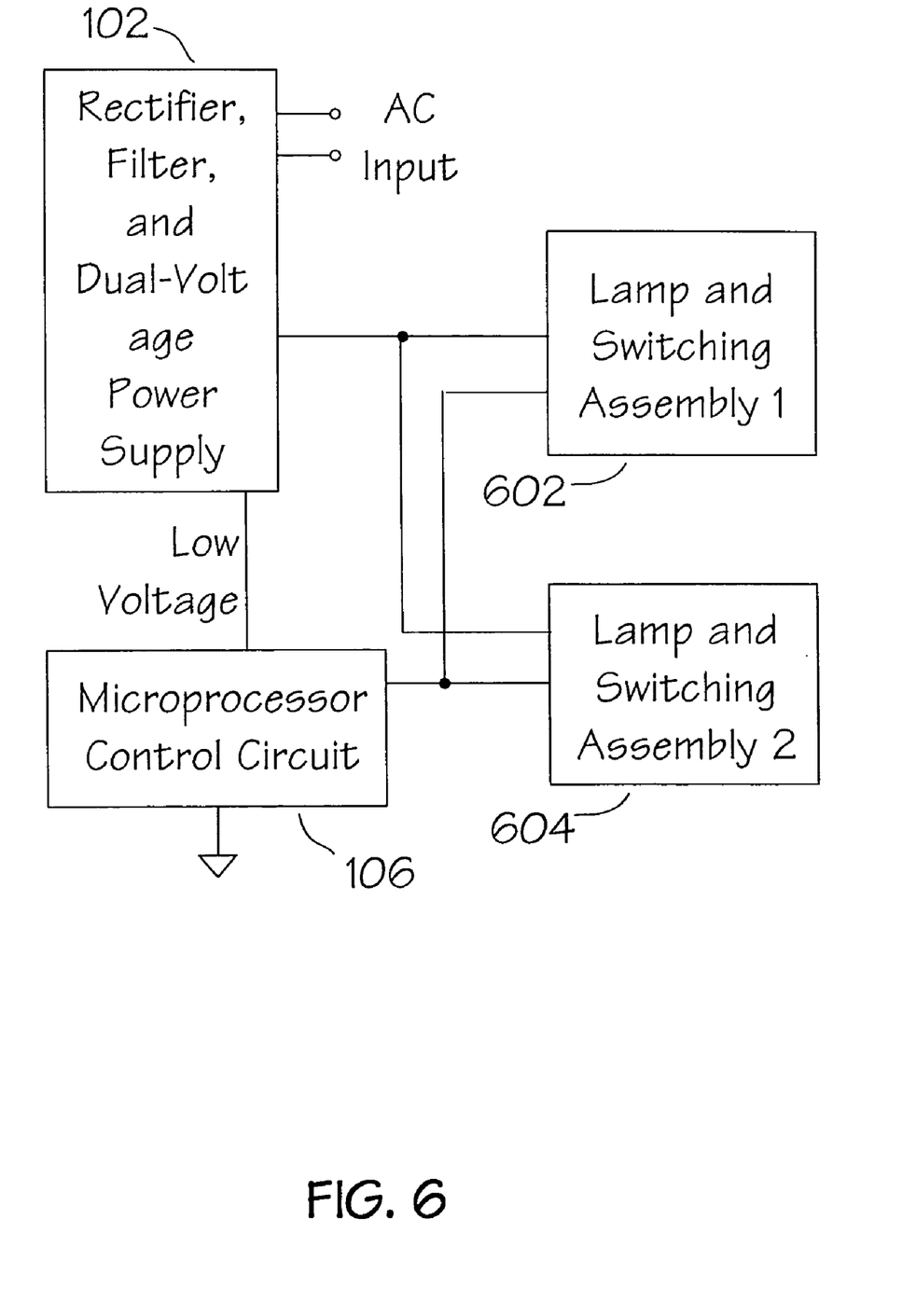
FIG. 6 is a block diagram of an alternate embodiment of the invention: frequency multiplexed optical transmission.

Refer to FIG. 6.

As discussed previously, the use of more than two optical flash rates or frequencies to simultaneously transmit or represent two or more data symbols is anticipated by the invention, and it is here in FIG. 6 that one such application is demonstrated.

As referred to before in the discussion of the main embodiment and in discussion of FIG. 1, the power from the AC mains of the building enters into the ballast assembly and is applied to Rectifier, Filter, and Dual-Voltage Power Supply (102) wherein it is rectified and filtered and outputted as two voltages: Low Voltage and High Voltage.

Also as before, the Low Voltage is distributed to Microprocessor Control Circuit (106) and to other circuits and assemblies that are auxiliary to Microprocessor Control Circuit (106). Note that while their are no auxiliary and/or support circuits shown, many are possible, and indeed some have been discussed herein.

Microprocessor Control Circuit (106) consists of a microprocessor, clock, and other support circuitry, and also includes both operating program memory, and memory used to store data messages that are to be transmitted. The microprocessor in Microprocessor Control Circuit (106) generates signals that are used to control the switching rate of each of the Lamp and Switching Assembly (150).

Each of Lamp and Switching Assembly 1 (602) and Lamp and Switching Assembly 2 (604) represents the switching, transformer, and lamp function blocks as defined as Lamp and Switching Assembly (150) herein. That is, Switching Circuit (104), Transformer (108), and Fluorescent Tube (4), as discussed in the main embodiment, are within each of Lamp and Switching Assembly 1 (602) and Lamp and Switching Assembly 2 (604).

Each of the Lamp and Switching Assembly 1 (602) and Lamp and Switching Assembly 2 (604) are operated by Microprocessor Control Circuit (106) so as to use different optical flash rates or frequencies from each other, thus facilitating two independent means of data generation or transmission by optical energy.

For example, Lamp and Switching Assembly 1 (602) may operate at 40 kHz and 42 kHz for symbols 0 and 1 respectively, and Lamp and Switching Assembly 2 (604) may operate at 45 kHz and 47 kHz for symbols 0 and 1 respectively.

Note that it is not of importance to the claims of this invention as to how the optical flash rates or frequencies are generated or used. Generation of the optical flash rates or frequencies used herein can be directly as an output of the microprocessor, or by a separate generation circuit under control of the microprocessor.

CONCLUSIONS, RAMIFICATIONS, AND SCOPE OF INVENTION

Accordingly, the reader will see that the incorporation of data transmission by optical-wave means in devices used for the lighting of both working and living areas, facilitates:

The ability to utilize an existing infrastructure for the transmission of data messages.

The ability to track and locate a user or device within a facility, with greater accuracy and lower cost compared to existing technologies.

A rapidly and easily installed wireless transmission system, not requiring licensing.

The reduction of radio frequency congestion by reducing or eliminating In-House radio transmissions.

The reduction of radio frequency congestion by reducing or eliminating public carrier system paging, messaging, or control channel radio transmissions.

The command, control, and operation, of radio units in areas of high radio density, by utilizing optical means, thus resulting in greater efficiency and less interference and interruption.

The delivery of messaging and paging services by optical means, whilst an otherwise radio device is transmitting or receiving radio traffic.

Additional radio frequency re-use in a coordinated and controlled radio system.

The transceiving of user status information, messaging traffic, and other data, to a radio device using optical means.

Greater top-security and privacy communications, through the utilization of the optical means as a physically more-limited distribution channel, for the delivery of changing encryption keys and other security data and signaling, in various secure communications schemes.

A more transparent operation of PBX systems and equipment.

The operation of Public Address and audible paging systems that minimize disturbance to others.

The operation of message paging and personnel/equipment locating systems on military vessels so as to not be detectable by enemy electronic surveillance measures.

The operation of message paging and personnel/equipment locating systems on metal-constructed vessels, without the interference, reflections, cancellations, echoes, or lapse in coverage, that a radio-based system would otherwise suffer from.

Although the descriptions above and herein contain many specificities, these should not be construed as limiting the scope of the invention but as merely providing illustrations of some of the offered embodiments of the invention.

For example, the optical communications medium could be in the visible spectrum or the infrared spectrum, or even the ultra-violet spectrum, etc.; any apparatus that makes use of the invention, may incorporate a filter or filters, or other means, so as to limit the outputted light spectrum to one or more of the visible spectrum, the infrared spectrum, or the ultra-violet spectrum; or any apparatus that makes use of the invention, may utilize an arc or discharge lamp that by design limits the outputted light spectrum to one or more of the visible spectrum, the infrared spectrum, or the ultra-violet spectrum.

The application of the invention anticipates transmitting data such as:

lamp or location serial number location data or messages control data or messages for computing or radio devices local radio communications system data or control messages the retransmission of public carrier generated radio communications system data or control messages or other operating data or messaging local or wide-area generated paging information positioning or location correction factors messages compatible with the data format or output of or operations of existing satellite positioning systems or other positioning systems or services any distributed control system or service data any other internally or externally generated or derived data.

The application of the invention anticipates transmitting data by one or more of several optical modulation schemes, including but not limited to, frequency modulation-based schemes, phase modulation-based schemes, or amplitude modulation-based schemes.

The application of the invention further anticipates the receiving of data to be transmitted or used for programming the apparatus, or for controlling the apparatus by both hardwired means such as a serial data port, parallel data port, power-line carrier receiver, power-line carrier transceiver, encoded power-line signaling, or a wired network interface data port; or by wireless means such as a radio receiver, radio transceiver, common carrier radio receiver or transceiver, fiber optic port, optical data port, or infrared data port.

The application of the invention further anticipates its use in all types of lighting and lighting fixtures intended for use in living areas, working areas, inside of buildings, outside of buildings, in factories or plants, in single story as well as high-rise buildings, and even in parks and on streets and highways.

Further note, that the operation of the invention does not in any way depend upon modulation scheme or carrier frequency, and so application is anticipated to any and all data circuits and optical circuits without restriction. Also note that any combination of the number and type of optical receivers can be utilized with the invention.

Finally, note that within the specifications, the word "or" is used both exclusively and inclusively.

Accordingly, the scope of the invention should be determined not only by the embodiments and examples illustrated, but also by the appended claims and their legal equivalents.

I claim:

1. A system providing bidirectional communication with remote devices comprising a plurality of lamp fixtures in fixed positions, each lamp fixture having identification information; power lines connected to each fixture for supplying AC electrical energy for each lamp fixture; and a base station coupled to the power lines; each fixture comprising:

one or more lamps;

a power supply comprising a rectifier, a filter, and a dual voltage power supply, the power lines electrically connected to the power supply to provide AC electrical energy;

a power line carrier transceiver connected to the power lines adapted to receive a variable message including lamp fixture identification information transmitted by the base station over the power lines;

a switching circuit, the power supply electrically connected to the switching circuit to supply high voltage electrical energy to the switching circuit, the switching circuit electrically connected to each lamp to provide electrical energy to each lamp to cause each lamp to produce light; the switching circuit capable of encoding a second variable message as an optical signal by generating a plurality of frequencies to modulate the high voltage electrical energy supplied to each lamp to frequency shift the light produced by each lamp to generate an optical signal;

a microprocessor control circuit having memory circuitry and programmed with lamp fixture identification information, the microprocessor control circuit coupled to the power line carrier transceiver and the switching circuit, the microprocessor control circuit receiving the variable message from the power line carrier transceiver, the microprocessor capable of decoding the variable message, and, in response to identifying the lamp identification information and the decoded variable message, encoding a second variable message, including at least one remote device address and the identification information of the fixture, by controlling the switching rate of the switching circuit to generate a plurality of frequencies to modulate the high voltage electric energy supplied to each lamp to modulate the light produced by each lamp to encode and transmit the second variable message as an optical signal; and a radio transceiver that receives modulated radio signals from a remote device positioned to receive the modulate light from the lamps one or more of the fixtures, the remote device capable of decoding the second variable message encoded in the optical signal and responding to its address and the second variable message in the decoded optical signal by transmitting a radio signal to the radio transceiver, the radio signal including the identification information of the fixture from which the remote device received the optical signal.

2. The system as defined in claim 1, wherein at least one of the lamps is a gas discharge lamp.

3. The system as defined in claim 1, wherein at least one of the lamps is a fluorescent lamp.

4. The system as defined in claim 1, wherein at least one of the lamps is a metal halide lamp.

5. The system as defined in claim 1, wherein at least one of the lamps is a mercury vapor lamp.

6. The system as defined in claim 1, wherein at least one of the lamps is a sodium vapor lamp.

7. The system as defined in claim 1, wherein at least one of the lamps is a neon lamp.

8. The system as defined in claim 1, wherein each of the fixtures is capable of uniquely modulating the light generated by the fixture's lamps to generate and transmit unique optical signals.

9. The system as defined in claim 1, wherein microprocessor control circuit is capable of receiving the radio signal from the radio transceiver and decoding the radio signal, encoding a third variable message from the decoded radio signal, and controlling the power line carrier transceiver to transmit the encoded third variable message via the power lines to the base station; and the base station is capable of decoding the third variable message, the third variable message including the identification information of the fixture receiving the radio signal from the remote device.

10. The system as defined in claim 1, wherein each fixture has a first lamp and a second lamp, each lamp being independently controllable by the microprocessor control circuit to modulate the light of the first lamp at a first frequency shift and to modulate the light of the second lamp at a second frequency shift different from the first frequency shift to produce different optical signals.

11. The system as defined in claim 1, wherein the microprocessor control circuit includes preprogrammed data that corresponds to the unique identification information of the fixture, the microprocessor responsive to the variable message from the power line carrier transceiver capable of generating switching rates to the switching circuit to modulate the light generated by the lamp in the fixture in response to the variable message and to modulate the light generated by the lamp in the fixture in response to the preprogrammed data.

12. The system as defined in claim 1, wherein the switching circuit switching rate modulates the light generated by a lamp in the fixture.

13. The system as define in claim 1, wherein each lamp fixture has a unique identification information.

14. The system as defined in claim 1, wherein the remote device is a movable remote device.

15. The system as defined in claim 9, wherein the plurality of fixtures are located in predetermined locations such that the location of the remote device can be determined by the base station by monitoring the identification information of the fixture receiving the radio signal from the remote device.

16. The system as defined in claim 14, wherein the movable remote device is a handheld device.

17. The system as defined in claim 14, wherein the remote device is a movable device.

18. The system as defined in claim 16, wherein the movable device is a handheld device.

19. A method for locating a remote device, comprising:

transmitting a command signal with unique identification information for one or more lamp fixtures to a plurality of lamp fixtures;

receiving and decoding the command signal in the lamp fixtures with the unique identification information and encoding a message in an optical signal by modulating the light produced by lamps in the fixtures in response to the command;

receiving the optical signal from at least one of the lamp fixtures by a remote device, the modulated light received by the remote device including the encoded message in the optical signal responsive to the command and including the address of the remote device and the identification information of the lamp fixture from which the movable device receives the optical signal; and transmitting a radio signal from the remote device to a radio receiver in the lamp fixture with the unique identification information, the radio signal including the identification information of the lamp fixture transmitting the optical signal received by the remote device to thereby identify the lamp fixture.

20. A system providing bidirectional communication with remote devices comprising a plurality of fluorescent lamp fixtures in fixed positions, each lamp fixture having unique identification information, each lamp fixture is capable of uniquely modulating the light generated by the fixture's lamps to generate and transmit unique optical signals, the lamp fixtures located in predetermined locations; power lines connected to each fixture for supplying AC electrical energy for each lamp fixture; and a base station coupled to the power lines; each fixture comprising:

one or more lamps;

a power supply comprising a rectifier, a filter, and a dual voltage power supply, the power lines electrically connected to the power supply to provide AC electrical energy;

a power line carrier transceiver connected to the power lines adapted to receive a variable message including lamp fixture identification information transmitted by the base station over the power lines;

a switching circuit, the power supply electrically connected to the switching circuit to supply high voltage electrical energy to the switching circuit, the switching circuit electrically connected to each lamp to provide electrical energy to each lamp to cause each lamp to produce light; the switching circuit capable of encoding a second variable message as an optical signal by generating a plurality of frequencies to modulate the high voltage electrical energy supplied to each lamp to frequency shift the light produced by each lamp to generate an optical signal;

a microprocessor control circuit having memory circuitry and programmed with lamp fixture identification information, the microprocessor control circuit coupled to the power line carrier transceiver and the switching circuit, the microprocessor control circuit receiving the variable message from the power line carrier transceiver, the microprocessor capable of decoding the variable message, and, in response to identifying the lamp identification information and the decoded variable message, encoding a second variable message, including at least one remote device address and the identification information of the fixture, by controlling the switching rate of the switching circuit to generate a plurality of frequencies to modulate the high voltage electric energy supplied to each lamp to modulate the light produced by each lamp to encode and transmit the second variable message as an optical signal; and a radio transceiver that receives modulated radio signals from a remote device positioned to receive the modulate light from the lamps one or more of the fixtures, the remote device capable of decoding the second variable message encoded in the optical signal and responding to its address and the second variable message in the decoded optical signal by transmitting a radio signal to the radio transceiver, the radio signal including the identification information of the fixture from which the remote device received the optical signal.

21. The system as defined in claim 20, wherein the microprocessor control circuit includes preprogrammed data that corresponds to the unique identification information of the fixture, the microprocessor responsive to the variable message from the power line carrier transceiver capable of generating switching rates to the switching circuit to modulate the light generated by the lamp in the fixture in response to the variable message and to modulate the light generated by the lamp in the fixture in response to the preprogrammed data.

22. The system as defined in claim 20, wherein the remote device is a movable remote device.

23. The system as defined in claim 20, wherein the movable remote device is a handheld device.

* * * * *